(12) United States Patent
Wang (10) Patent No.: US 9,699,706 B2
(45) Date of Patent: Jul. 4, 2017

(54) DATA PACKET SENDING METHOD AND RADIO ACCESS NETWORK DEVICE

(71) Applicant: Huawei Technologies Co., Ltd., Shenzhen, Guangdong (CN)

(72) Inventor: Xueliang Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 181 days.

(21) Appl. No.: 14/264,989

(22) Filed: Apr. 29, 2014

(65) Prior Publication Data

US 2014/0233508 A1  Aug. 21, 2014

Related U.S. Application Data

(63) Continuation of application No. PCT/CN2012/083863, filed on Oct. 31, 2012.

(30) Foreign Application Priority Data

Oct. 31, 2011  (CN) .......................... 2011 1 0337666

(51) Int. Cl.
*H04W 40/02* (2009.01)
*H04W 76/04* (2009.01)
(Continued)

(52) U.S. Cl.
CPC ............ *H04W 40/02* (2013.01); *H04L 47/28* (2013.01); *H04W 8/22* (2013.01);
(Continued)

(58) Field of Classification Search
None
See application file for complete search history.

(56) References Cited

U.S. PATENT DOCUMENTS 6,760,303 B1 * 7/2004 Brouwer ............... H04W 36/06
370/229
7,099,346 B1  8/2006 Kanterakis
(Continued)

FOREIGN PATENT DOCUMENTS

CN   101442771 A   5/2009
CN   101489263 A   7/2009
(Continued)

OTHER PUBLICATIONS

"3rd Generation Partnership Project; Technical Specification Group Radio Access Network; Radio Resource Control (RRC); Protocol specification (Release 10)," 3GPP TS 25.331, V10.5.0, pp. 1-1882, 3rd Generation Partnership Project, Valbonne, France (Sep. 2011).

*Primary Examiner* — Huy D Vu
*Assistant Examiner* — Teisha D Hall
(74) *Attorney, Agent, or Firm* — Leydig, Voit & Mayer, Ltd.

(57) ABSTRACT

Embodiments of the present invention provide a data packet sending method and a radio access network device. The method includes: receiving, by a radio access network device, a data packet sent by a core network device; acquiring duration that the data packet is cached on the radio access network device; and if the duration that the data packet is cached is greater than or equal to a preset wait duration threshold, transiting a user equipment that is in a CELL_FACH state and is corresponding to the data packet to a CELL_DCH state, and sending the data packet to the user equipment that is transited to the CELL_DCH state. The technical solutions in the present invention enable the UE to acquire a data packet in time to normally carry out a service when congestion occurs on a FACH, thereby improving the degree of user experience.

10 Claims, 4 Drawing Sheets

(51) Int. Cl.
*H04L 12/841* (2013.01)
*H04W 8/22* (2009.01)
*H04W 28/02* (2009.01)
*H04W 72/12* (2009.01)

(52) U.S. Cl.
CPC ..... *H04W 28/0231* (2013.01); *H04W 76/046* (2013.01); *H04W 72/1221* (2013.01)

(56) References Cited

U.S. PATENT DOCUMENTS

| | | |
|---|---|---|
| 2007/0249360 A1 | 10/2007 | Das et al. |
| 2009/0135769 A1* | 5/2009 | Sambhwani .......... H04L 5/0053 370/329 |
| 2009/0213865 A1* | 8/2009 | Stephens ............. H04L 12/5693 370/412 |
| 2012/0093113 A1 | 4/2012 | Zhu et al. |

FOREIGN PATENT DOCUMENTS

| | | |
|---|---|---|
| CN | 101931891 A | 12/2010 |
| EP | 1193991 A2 | 4/2002 |
| EP | 2276315 A1 | 1/2011 |
| GB | 2477118 A | 7/2011 |
| WO | WO 2010047630 A1 | 4/2010 |

\* cited by examiner

DATA PACKET SENDING METHOD AND RADIO ACCESS NETWORK DEVICE

CROSS-REFERENCE TO RELATED APPLICATIONS

This application is a continuation of International Patent Application No. PCT/CN2012/083863, filed on Oct. 31, 2012, which claims priority to Chinese Patent Application No. 201110337666.2, filed on Oct. 31, 2011, both of which are hereby incorporated by reference in their entireties.

TECHNICAL FIELD

The present invention relates to mobile communications technologies, and in particular, to a data packet sending method and a radio access network device.

BACKGROUND

In a wideband code division multiple access (Wideband Code Division Multiple Access, referred to as WCDMA) system, after a permanently online mode is adopted to deal with a growth of the number of user equipments (User Equipment, referred to as UE), a forward access channel (Forward Access Channel, referred to as FACH) bears a large amount of signaling data and part of user plane data. Because a bandwidth of an FACH is limited, congestion is likely to occur on the FACH. When the congestion occurs on the FACH, a user cannot receive a data packet in time, and consequently, the user cannot normally carry out a service.

With respect to the problem, a method for transiting a state of a traffic volume is put forward in the prior art. In the method, when congestion occurs on a FACH, a radio network controller (Radio Network Controller, referred to as RNC) determines whether a size of all data packets cached on the RNC and corresponding to a user equipment exceeds a preset traffic volume threshold; and if exceeds, the user equipment is transited from a CELL_FACH state to a CELL_DCH state. In this way, the data packets corresponding to the user equipment can be sent to the user equipment through a DCH or an HS-DSCH, thereby ensuring that a user normally carries out a service. The transition from the CELL_FACH state to the CELL_DCH state (State Transition from CELL_FACH to CELL_DCH) is generally referred to as F2D.

However, in many application scenarios, for example, when a user establishes a link by using a transport control protocol (Transport Control Protocol, referred to as TCP) in a process of logging in to a network, a domain name server (Domain Name Server, referred to as DNS) is resolved in a process that a user logs in to a network, or a DNS is resolved when a web page is opened or the like, a size of generated data packets is usually small and does not reach a traffic volume threshold required for triggering F2D transition, and consequently, these data packets cannot be delivered to the user in time and the user cannot normally carry out a service.

SUMMARY

Embodiments of the present invention provide a data packet sending method and a radio access network device, so as to solve a problem that a user cannot normally carry out a service when congestion occurs on an FACH.

In a first aspect, a data packet sending method is provided and includes:

receiving, by a radio access network device, a data packet sent by a core network device;

acquiring, by the radio access network device, duration that the data packet is cached on the radio access network device; and if the duration that the data packet is cached is greater than or equal to a preset wait duration threshold, transiting, by the radio access network device, a user equipment that is in a CELL_FACH state and is corresponding to the data packet to a CELL_DCH state, and sending the data packet to the user equipment that is transited to the CELL_DCH state.

In a first possible implementation manner of the first aspect, when the radio access network device schedules and sends a data packet corresponding to another user equipment, the radio access network device acquires the duration that the data packet is cached, where the data packet is corresponding to the user equipment in the CELL_FACH state; or, when a preset period arrives, the radio access network device acquires the duration that the data packet is cached, where the data packet is corresponding to the user equipment in the CELL_FACH state.

In a second possible implementation manner of the first aspect, the transiting, by the radio access network device, a user equipment that is in a CELL_FACH state and is corresponding to the data packet to a CELL_DCH state includes: sending, by the radio access network device, a radio bearer reconfiguration message to the user equipment in the CELL_FACH state.

With reference to the first aspect or the first or second possible implementation manner of the first aspect, in a third possible implementation manner, before the acquiring, by the radio access network device, duration that the data packet is cached, the method includes: determining, by the radio access network device, whether a size of all data packets that are cached on the radio access network device and are corresponding to the user equipment in the CELL_FACH state is greater than or equal to a preset traffic volume threshold; and if a determination result is no, performing, by the radio access network device, an operation of acquiring the duration that the data packet is cached.

In a fourth possible implementation manner of the first aspect, if the duration that the data packet is cached is smaller than or equal to the wait duration threshold, the data packet is sent to the user equipment in the CELL_FACH state through a forward access channel FACH.

With reference to the first aspect or the first or second possible implementation manner of the first aspect, in a fifth possible implementation manner, if the duration that the data packet is cached is smaller than or equal to the wait duration threshold, the radio access network device determines whether a size of all data packets that are cached on the radio access network device and are corresponding to the user equipment in the CELL_FACH state is greater than or equal to a preset traffic volume threshold; if a determination result is yes, the radio access network device transits the user equipment in the CELL_FACH state to the CELL_DCH state, and sends the data packet to the user equipment that is transited to the CELL_DCH state; and if the determination result is no, the radio access network device sends the data packet to the user equipment in the CELL_FACH state through a forward access channel FACH.

In a second aspect, a radio access network device is provided and includes:

a receiving module, configured to receive a data packet sent by a core network device;

an acquiring module, configured to acquire duration that the data packet received by the receiving module is cached on the radio access network device; and a first sending module, configured to, if the duration that the data packet is cached is greater than or equal to a preset wait duration threshold, where the duration that the data packet is cached is acquired by the acquiring module, transit a user equipment that is in a CELL_FACH state and is corresponding to the data packet to a CELL_DCH state, and send the data packet to the user equipment that is transited to the CELL_DCH state.

In a first possible implementation manner of the second aspect, the acquiring module includes a first acquiring unit, configured to, when a data packet corresponding to another user equipment is scheduled and sent, acquire the duration that the data packet received by the receiving module is cached, where the data packet received by the receiving module is corresponding to the user equipment in the CELL_FACH state; and/or a second acquiring unit, configured to, when a preset period arrives, acquire the duration that the data packet received by the receiving module is cached, where the data packet received by the receiving module is corresponding to the user equipment in the CELL_FACH state.

In a second possible implementation manner of the second aspect, the first sending module is specifically configured to, if the duration that the data packet is cached is greater than or equal to the preset wait duration threshold, where the duration that the data packet is cached is acquired by the acquiring module, send a radio bearer reconfiguration message to the user equipment in the CELL_FACH state to enable the user equipment in the CELL_FACH state to be transited to the CELL_DCH state; and send the data packet to the user equipment that is transited to the CELL_DCH state.

With reference to the second aspect or the first or second possible implementation manner of the second aspect, in a third possible implementation manner, the radio access network device further includes a first determining module, configured to, before the acquiring module acquires the duration that the data packet is cached, determine whether a size of all data packets that are cached on the radio access network device and are corresponding to the user equipment in the CELL_FACH state is greater than or equal to a preset traffic volume threshold; and the acquiring module is further configured to, when a determination result of the first determining module is no, perform an operation of acquiring the duration that the data packet is cached.

In a fourth possible implementation manner of the second aspect, the radio access network device further includes a second sending module, configured to, if the duration that the data packet is cached is smaller than or equal to the wait duration threshold, where the duration that the data packet is cached is acquired by the acquiring module, send the data packet to the user equipment in the CELL_FACH state through a forward access channel FACH.

With reference to the second aspect or the first or second possible implementation manner of the second aspect, in a fifth possible implementation manner, the radio access network device further includes a second determining module, configured to, if the duration that the data packet is cached is smaller than or equal to the wait duration threshold, where the duration that the data packet is cached is acquired by the acquiring module, determine whether a size of all data packets that are cached on the radio access network device and are corresponding to the user equipment in the CELL_FACH state is greater than or equal to a preset traffic volume threshold; the first sending module is further configured to, when a determination result of the second determining module is yes, transit the user equipment that is in the CELL_FACH state and is corresponding to the data packet to the CELL_DCH state, and send the data packet to the user equipment that is transited to the CELL_DCH state; and the second sending module is further configured to, when the determination result of the second determining module is no, send the data packet to the user equipment in the CELL_FACH state through a forward access channel FACH.

With the data packet sending method and the radio access network device provided in the embodiments of the present invention, duration that a data packet is cached on a radio access network device is acquired, and a UE that is in a CELL_FACH state and is corresponding to the data packet is transited to a CELL_DCH state according to the duration that the data packet is cached on the radio access network device, so that when congestion occurs on a FACH, the UE can acquire the data packet in time to normally carry out a service, thereby improving the degree of user experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
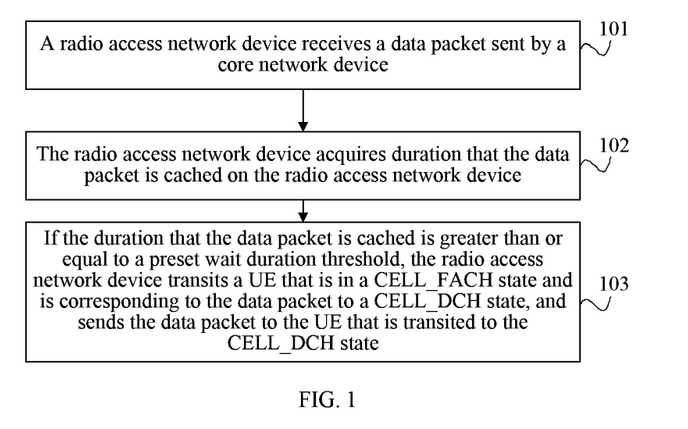
FIG. 1 is a flow chart of a data packet sending method according to an embodiment of the present invention.

FIG. 1 is a flow chart of a data packet sending method according to an embodiment of the present invention. As shown in FIG. 1, the method in this embodiment includes:

Step 101: A radio access network device receives a data packet sent by a core network device.

This embodiment can be applied in a variety of communication systems, for example, can be applied in a WCDMA system or a long term evolution (Long Term Evolution, referred to as LTE) system, which is not limited in present invention. For example, when this embodiment is applied in a WCDMA system, the radio access network device may be an RNC. The embodiments of the present invention are described by using an example that the radio access network device is an RNC in a WCDMA system, but it is not limited thereto. When the radio access network device is the RNC in the WCDMA system, the core network device, for example, may be a serving general packet radio service support node (Serving GPRS Support Node, referred to as SGSN) and may also be a mobile switching center (Mobile Switching Center, referred to as MSC). The RNC receives a data packet sent by the core network device, for example, which may include: The RNC receives a downlink data packet delivered by an SGSN. The downlink data packet, for example, may include a user plane message and/or a signaling plane message.

Step 102: The radio access network device acquires duration that the data packet is cached on the radio access network device.

In an actual application, for example, after the RNC receives a data packet sent by the core network device, the RNC may place the data packet in a cache queue of an FACH first, and then schedules the data packet. When scheduling a certain data packet, the RNC allocates a channel resource for the scheduled data packet and delivers the data packet to a user equipment. The RNC may acquire duration that the data packet is cached on the RNC.

In this embodiment, for example, when the RNC schedules a data packet that needs to be delivered to a UE1, the RNC may acquire duration that a data packet that is cached on the RNC, is not scheduled, and needs to be delivered to a UE2. For another example, a period may further be set, and when a preset period arrives, the RNC performs an operation of acquiring the duration that the received data packet is cached on the RNC.

Step 103: If the duration that the data packet is cached is greater than or equal to a preset wait duration threshold, the radio access network device transits a UE that is in a CELL_FACH state and is corresponding to the data packet to a CELL_DCH state, and sends the data packet to the UE that is transited to the CELL_DCH state.

The longer the duration that the data packet is cached on the RNC is, the longer the time that a user corresponding to the data packet, that is, needing to receive the data packet waits is, and the worse the degree of user experience is.

Generally, a user has a certain tolerance to a delay of a data packet; and when the delay of the data packet exceeds the tolerance of the user, the user probably terminates a current service. To enable the user to receive a corresponding data packet within the tolerance of the user, in this embodiment, the RNC may preset a wait duration threshold, where the wait duration threshold may represent tolerance of a user.

The wait duration threshold in this embodiment, for example, may be a certain preset time value, for example, 10 seconds (s). For another example, the wait duration threshold may also be set within a range of 3 s to 5 s. The set range of the wait duration threshold provided in the foregoing is merely an example, but it is not limited thereto.

In a WCDMA system, two basic operation modes of a UE are an idle mode and a connection mode. The connection mode of the UE may further be classified into different service states, for example, a CELL_FACH state, a CELL_DCH state, a CELL_PCH state, and a URA_PCH state.

The CELL_FACH state may include an ordinary FACH and an enhanced FACH (Enhanced FACH, referred to as E-FACH). In the CELL_FACH state, users in the same cell use a common FACH to bear data; in the CELL_DCH state, each user has a dedicated air interface resource to transmit data, where the dedicated air interface resource is a DCH or an HS-DSCH; and in the CELL_PCH state and the URA_PCH state, a user monitors only a paging channel.

Service states in the connection mode, and the connection mode and the idle mode are interconvertible.

In this embodiment, the UE corresponding to the data packet, that is, the UE that needs to receive the data packet is in a connection state and in a CELL_FACH state. When the duration that the data packet is cached is greater than or equal to the wait duration threshold, to ensure that the data packet can be delivered to the UE in time, the RNC transits the UE that is in the CELL_FACH state and is corresponding to the data packet to a CELL_DCH state, and sends the data packet to the UE that is transited to the CELL_DCH state. In this case, the RNC can send the data packet to the UE through a DCH or an HS_SDCH, so that the UE can receive the data packet in time when congestion occurs on a FACH, and a service can be normally carried out, thereby improving the degree of user experience.

The RNC transits the UE in the CELL_FACH state to the CELL_DCH state, for example, which may be: The RNC sends a radio bearer reconfiguration message (RADIO BEARER RECONFIGURATION) to the UE to enable the UE to be transited from the CELL_FACH state to the CELL_DCH state, but it is not limited thereto.

In this embodiment, an RNC acquires duration that a data packet is cached on the RNC, and transits, according to the duration that the data packet is cached on the RNC, a UE that is in a CELL_FACH state and is corresponding to the data packet to a CELL_DCH state; and in this way, a problem in the prior art that when congestion occurs on a FACH, a data packet cannot be delivered to a UE in time because a size of all data packets that are cached on an RNC and are corresponding to the UE in a CELL_FACH state does not reach a traffic volume threshold required for state transition is solved, so that the UE can acquire the data packet in time to normally carry out a service, thereby improving user experience.

Figure 2:
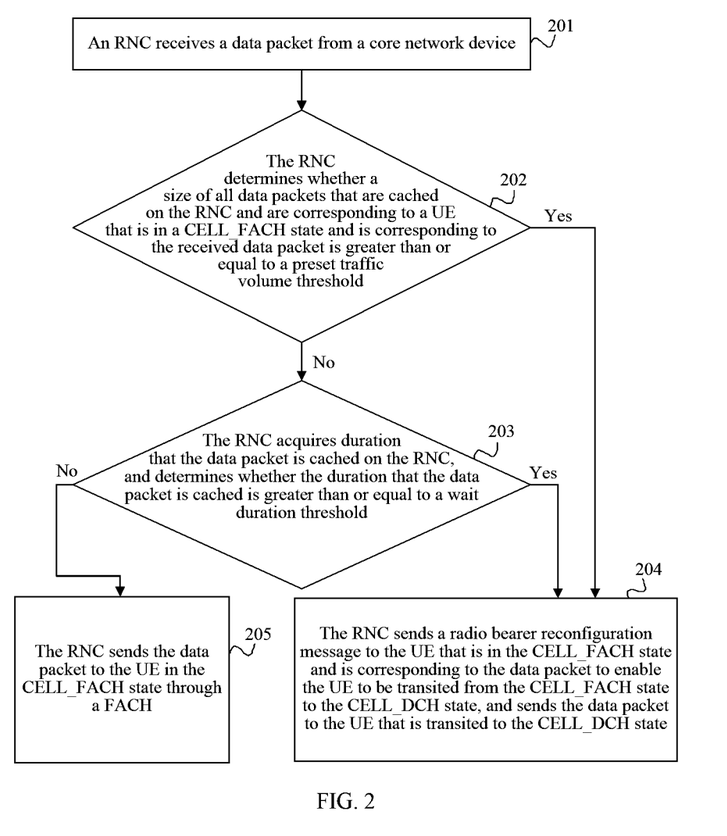
FIG. 2 is a flow chart of a data packet sending method according to another embodiment of the present invention.

FIG. 2 is a flow chart of a data packet sending method according to another embodiment of the present invention. As shown in FIG. 2, the method in this embodiment includes:

Step 201: An RNC receives a data packet from a core network device.

This step is similar to step 101, and for details, reference may be made to the description in step 101. A UE corresponding to the data packet received by the RNC, that is, a UE that needs to receive the data packet through the RNC is in a CELL_FACH state.

Step 202: The RNC determines whether a size of all data packets that are cached on the RNC and are corresponding to the UE that is in the CELL_FACH state and is corresponding to the received data packet is greater than or equal to a preset traffic volume threshold. If a determination result is no, perform step 203; and if the determination result is yes, perform step 204.

In this embodiment, it is assumed that congestion occurs on a FACH.

The traffic volume threshold is a condition for determining, based on a traffic volume, whether to transit the UE in the CELL_FACH state to a CELL_DCH state. For example, the traffic volume threshold may be a certain preset value, for example, 30 bytes.

Based on the foregoing description, step 202 may specifically be: Before the data packet is scheduled, the RNC first acquires a size of all data packets corresponding to the UE that is in the CELL_FACH state and is corresponding to the data packet received in step 201 among data packets that are cached on the RNC, and then determines whether the size of all the acquired data packets that are cached and corresponding to the UE in the CELL_FACH state is greater than or equal to the traffic volume threshold. If a determination result is yes, the RNC transits the UE in the CELL_FACH state to a CELL_DCH state, that is, based on a traffic volume, enables the UE to complete state transition. If the determination result is no, the RNC further determines, based on duration that the data packet is cached, whether to enable the RNC to be transited the UE in the CELL_FACH state to the CELL_DCH state, and then enables the UE to complete the state transition; that is, perform step 203.

Step 203: The RNC acquires duration that the data packet is cached on the RNC, and determines whether the duration that the data packet is cached is greater than or equal to a wait duration threshold. If a determination result is yes, perform step 204; and if the determination result is no, perform step 205.

For example, before the data packet is scheduled and sent and when a preset period arrives, the RNC may acquire the duration that the data packet is cached. In addition, when a data packet of another UE is scheduled and sent, the RNC may also acquire the duration that the data packet is cached.

In step 203, the RNC determines, in a condition that the data packet sent by the core network device fails to enable, based on a traffic volume, the RNC to transit the UE in the CELL_FACH state to the CELL_DCH state, whether the duration that the data packet is cached is greater than or equal to the wait duration threshold. If a determination result is yes in this case, the RNC transits the UE in the CELL_FACH state to the CELL_DCH state and enables the UE to complete the state transition. For a specific implementation manner for determining whether the duration that the data packet is cached is greater than or equal to the wait duration threshold, reference may be made to the description in step 103, and details are not described herein again.

Step 204: The RNC sends a radio bearer reconfiguration message to the UE that is in the CELL_FACH state and is corresponding to the data packet to enable the UE to be transited from the CELL_FACH state to the CELL_DCH state, and sends the data packet to the UE that is transited to the CELL_DCH state.

For this step, reference may be made to the detailed description in step 103, and details are not described herein again.

Step 205: The RNC sends the data packet to the UE in the CELL_FACH state through the FACH.

When the data packet is scheduled, the RNC sends the data packet to the corresponding UE in the CELL_FACH state through the FACH.

With the data packet sending method according to this embodiment, in a condition that congestion occurs on a FACH, an RNC first determines, according to a traffic volume, whether to transit a UE in a CELL_FACH state to a CELL_DCH state; if it is determined, according to the traffic volume, that the UE in the CELL_FACH state does not need to be transited to the CELL_DCH state, the RNC further determines, according to duration that a data packet is cached, whether to transit the UE in the CELL_FACH state to the CELL_DCH state; and by combining a determination mechanism based on the traffic volume with a mechanism based on the duration that the data packet is cached, the RNC can transit the UE in the CELL_FACH state to the CELL_DCH state more timely, so that the data packet is sent to the UE through a DCH or an HS_SDCH, thereby improving timeliness that the UE acquires the data packet when the congestion occurs on the FACH, and facilitating the UE to normally carry out a variety of services. For example, the UE can log in to a network or open a web page in time.

Figure 3:
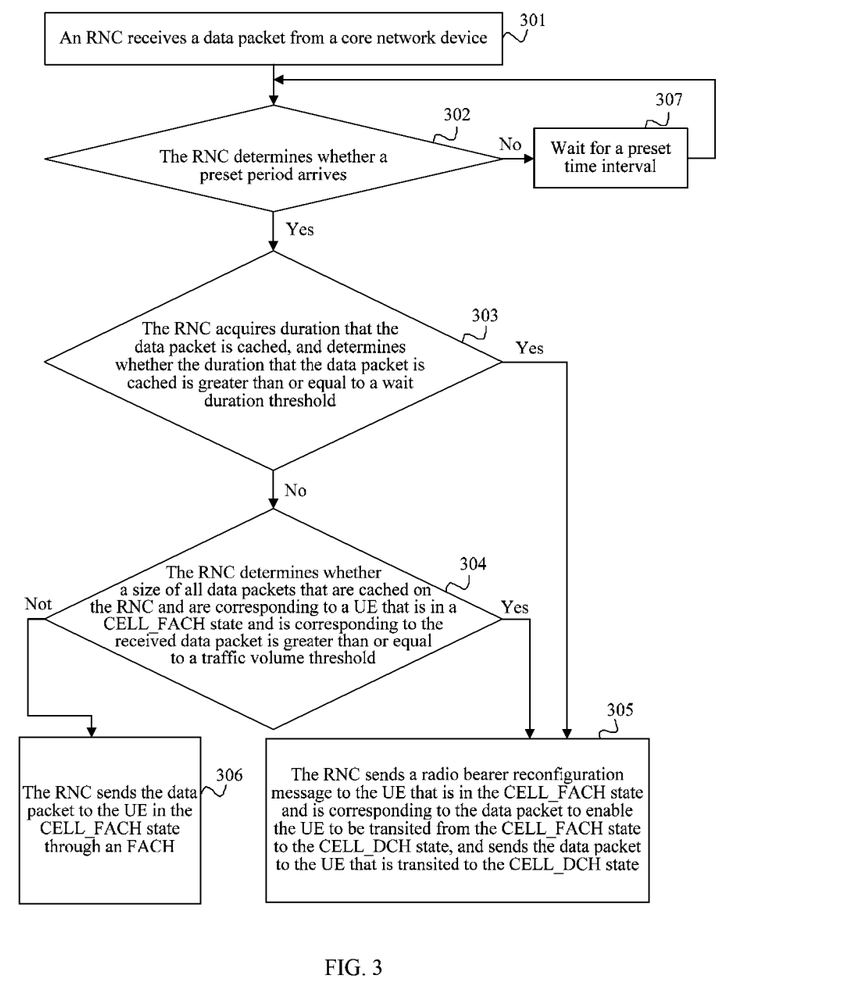
FIG. 3 is a flow chart of a data packet sending method according to still another embodiment of the present invention.

FIG. 3 is a flow chart of a data packet sending method according to still another embodiment of the present invention. As shown in FIG. 3, the method in this embodiment:

Step 301: An RNC receives a data packet from a core network device.

For this step, reference may be made to the description in step 201, and details are not described herein again.

Step 302: The RNC determines whether a preset period arrives. If a determination result is yes, perform step 303; and if the determination result is no, perform step 307.

In this embodiment, it is assumed that congestion occurs on a FACH.

In this embodiment, for example, the RNC may preset a period, for example, one second. The period, for example, may be implemented through a timer. When the preset period arrives, the RNC performs monitoring operations on a data packet that is not scheduled in a cache queue, where the monitoring operations are operations of acquiring duration that the data packet is cached on the RNC and determining whether the acquired duration that the data packet is cached is greater than or equal to a wait duration threshold described in step 303. When the preset period does not arrive, the RNC can wait as described in step 307, until the preset period arrives.

Step 303: The RNC acquires the duration that the data packet is cached, and determines whether the duration that the data packet is cached is greater than or equal to the wait duration threshold. If a determination result is no, perform step 304; and if the determination result is yes, perform step 305.

Step 304: The RNC determines whether a size of all data packets that are cached on the RNC and are corresponding to a UE that is in a CELL_FACH state and is corresponding to the received data packet is greater than or equal to a traffic volume threshold. If a determination result is yes, perform step 305; and if the determination result is no, perform step 306.

Step 305: The RNC transits the UE corresponding to the data packet from the CELL_FACH state to a CELL_DCH state, for example, the RNC may send a radio bearer reconfiguration message to the UE that is in the CELL_FACH state and is corresponding to the data packet to enable the UE to be transited from the CELL_FACH state to the CELL_DCH state, and sends the data packet to the UE that is transited to the CELL_DCH state.

For this step, reference may be made to the detailed description in step 103, and details are not described herein again.

Step 306: The RNC sends the data packet to the UE in the CELL_FACH state through the FACH.

When the data packet is scheduled, the RNC sends the data packet to the corresponding UE in the CELL_FACH state through the FACH.

Step 307: Wait for a preset time interval, and go back to perform step 302.

In this embodiment, the waiting refers to waiting for arrival of a preset period, but does not mean that the RNC is in an idle state during waiting for the arrival of the preset period, and the RNC can perform another operation during waiting for the arrival of the preset period. That is to say, that the RNC performs another operation is an operation parallel to an operation of waiting for the arrival of the preset period.

With the data packet sending method according to this embodiment, in a condition that congestion occurs on a FACH, an RNC first determines, according to duration that a data packet is cached, whether to transit a UE in a CELL_FACH state to a CELL_DCH state; if it is determined, according to the duration that the data packet is cached, that the UE in the CELL_FACH state does not need to be transited to the CELL_DCH state, the RNC further determines, according to a traffic volume, whether to transit the UE in the CELL_FACH state to the CELL_DCH state; and by combining a determination mechanism based on the duration that the data packet is cached with a determination mechanism based on the traffic volume, F2D reconfiguration can be triggered more timely, so that the data packet is sent to the UE through a DCH or an HS_SDCH, thereby improving timeliness that the UE acquires the data packet when the FACH is faulty, and facilitating the UE to carry out a variety of services based on the acquired data packet. For example, the UE can log in to a network or open a web page in time.

A difference between the embodiment shown in FIG. 3 and the embodiment shown in FIG. 2 is that the determination mechanism based on the traffic volume and the determination mechanism based on the duration that the data packet is cached are used in a different sequence. That is to say, in the embodiments of the present invention, the determination mechanism based on the duration that the data packet is cached may be used separately, or the determination mechanism based on the duration that the data packet is cached and the determination mechanism based on the traffic volume may be used at the same time. When the two determination mechanisms are used at the same time, the two determination mechanisms can exist as determination mechanisms independent to each other, and do not affect each other.

Figure 4:
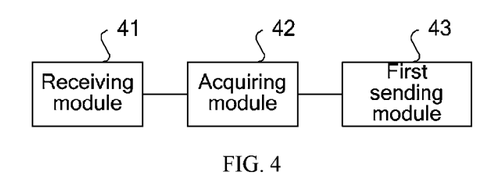
FIG. 4 is a schematic structural diagram of a radio access network device according to an embodiment of the present invention.

FIG. 4 is a schematic structural diagram of a radio access network device according to an embodiment of the present invention. As shown in FIG. 4, the radio access network device in this embodiment includes a receiving module 41, an acquiring module 42, and a first sending module 43.

The receiving module 41 is configured to receive a data packet sent by a core network device. The data packet sent by the core network device may include a downlink data packet delivered by the core network device. The downlink data packet, for example, may include a user plane message and/or a signaling plane message, where the signaling plane message may be an NAS message delivered by the core network device but it is not limited thereto. In this embodiment, the data packet sent by the core network device to the radio access network device needs to be delivered by the radio access network device to a UE.

The acquiring module 42 is connected to the receiving module 41 and is configured to acquire duration that the data packet received by the receiving module 41 is cached on the radio access network device. The first sending module 43 is connected to the acquiring module 42 and is configured to, if the duration that the data packet is cached is greater than or equal to a preset wait duration threshold, where the duration that the data packet is cached is acquired by the acquiring module 42, transit a UE that is in a CELL_FACH state and is corresponding to the data packet received by the receiving module 41 to a CELL_DCH state, and send the data packet received by the receiving module to the UE that is transited to the CELL_DCH state. The wait duration threshold in this embodiment may be a certain preset time value, for example, 10 seconds (s). The UE in this embodiment is in the CELL_FACH state.

The radio access network device in this embodiment may be an access device of a radio access network in systems such as a WCDMA or an LTE system, which is not limited in the present invention. For example, the radio access network device in this embodiment may be an RNC in a WCDMA system, and a corresponding core network device, for example, may be an SGSN and may also be an MSC.

The functional modules of the radio access network device in this embodiment may be configured to implement a procedure of the data packet sending method shown in FIG. 1; and specific working principles of the functional modules of the radio access network device are not described herein, and for details, reference is made to the description in the method embodiment.

The radio access network device in this embodiment acquires duration that a data packet is cached, and transits, according to the duration that the data packet is cached, a UE that is in a CELL_FACH state and is corresponding to the data packet to a CELL_DCH state; and in this way, a problem in the prior art that when congestion occurs on a FACH, a data packet cannot be delivered to a UE in time because a size of all data packets that are cached on an RNC and are corresponding to the UE in a CELL_FACH state does not reach a traffic volume threshold required for state transition is solved, so that the UE can acquire the data packet in time to normally carry out a service, thereby improving user experience.

Figure 5:
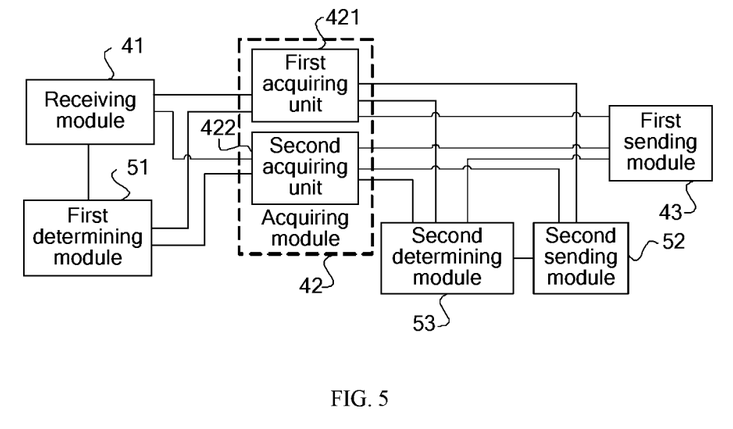
FIG. 5 is a schematic structural diagram of a radio access network device according to another embodiment of the present invention.

FIG. 5 is a schematic structural diagram of a radio access network device according to another embodiment of the present invention. This embodiment is implemented based on the embodiment shown in FIG. 4; and as shown in FIG. 5, an acquiring module 42 in this embodiment may include any one or a combination of the following acquiring units:

a first acquiring unit 421, configured to, when a data packet corresponding to another UE is scheduled and sent, acquire duration that a data packet is cached, where the data packet is received by a receiving module 41 and is corresponding to a user equipment in a CELL_FACH state; and a second acquiring unit 422, configured to, when a preset period arrives, acquire the duration that the data packet is cached, where the data packet is received by the receiving module 41 and is corresponding to the user equipment in the CELL_FACH state.

The foregoing functional units may be configured to implement a procedure of step 102 in the data packet sending method shown in FIG. 1; and specific working principles of the functional units are not described herein, and for details, reference is made to the description in the method embodiment.

Further, a first sending module 43 in this embodiment may be specifically configured to, if the duration that the data packet is cached is greater than or equal to a preset wait duration threshold, where the duration that the data packet is cached is acquired by the acquiring module 42, send a radio bearer reconfiguration message to the user equipment in the CELL_FACH state to enable the user equipment in the CELL_FACH state to be transited to a CELL_DCH state; and send the data packet received by the receiving module 41 to the user equipment that is transited to the CELL_DCH state. For a working principle of the first sending module 43, reference may be made to the description about the implementation manner for transiting the UE from the CELL_FACH state to the CELL_DCH state provided in step 103 in the data packet sending method shown in FIG. 1.

The radio access network device in this embodiment may further include a first determining module 51.

The first determining module 51 is connected to the receiving module 41 and is configured to, before the acquiring module 42 acquires the duration that the data packet is cached, determine whether a size of all data packets that are cached on the radio access network device and are corresponding to the user equipment in the CELL_FACH state is greater than or equal to a preset traffic volume threshold.

Further, the acquiring module 42 in this embodiment is further connected to the first determining module 51 and is configured to, when a determination result of the first determining module 51 is no, perform an operation of acquiring the duration that the data packet is cached.

Based on the foregoing description, the radio access network device in this embodiment further includes a second sending module 52. The second sending module 52 is connected to the acquiring module 42 and is configured to, if the duration that the data packet is cached is smaller than or equal to the wait duration threshold, where the duration that the data packet is cached is acquired by the acquiring module 42, send the data packet to the UE in the CELL_FACH state through a FACH.

The foregoing functional modules may be configured to implement a corresponding procedure in the data packet sending method shown in FIG. 2; and specific working principles of the functional modules are not described herein, and for details, reference is made to the description in the method embodiment.

In addition, the radio access network device in this embodiment may further include a second determining module 53.

The second determining module 53 is connected to the acquiring module 42 and is configured to, if the duration that the data packet is cached is smaller than or equal to the wait duration threshold, where the duration that the data packet is cached is acquired by the acquiring module 42, determine whether a size of all data packets that are cached on the radio access network device and are corresponding to the UE in the CELL_FACH state is greater than or equal to a preset traffic volume threshold.

Further, the first sending module 43 is further connected to the second determining module 53 and is configured to, when a determination result of the second determining module 53 is yes, perform an operation of transiting the UE that is in the CELL_FACH state and is corresponding to the data packet to the CELL_DCH state, and sending the data packet to the UE that is transited to the CELL_DCH state.

The second sending module 52 is further connected to the second determining module 53 and is configured to, when the determination result of the second determining module 53 is no, send the data packet to the UE in the CELL_FACH state through a FACH.

The foregoing functional modules may be configured to implement a corresponding procedure in the data packet sending method shown in FIG. 3; and specific working principles of the functional modules are not described herein, and for details, reference is made to the description in the method embodiment.

It is noted herein that because functions of the first determining module 51 and the second determining module 53 are similar, the first determining module 51 and the second determining module 53 can be implemented by the same module in actual implementation.

The radio access network device in this embodiment can combine a determination mechanism based on duration that a data packet is cached with a determination mechanism based on a traffic volume through the foregoing functional modules in a condition that congestion occurs on a FACH. First, the radio access network device determines, according to one of the two determination mechanisms, whether to transit a UE in a CELL_FACH state to a CELL_DCH state; if the radio access network device determines, according to one of the determination mechanisms, that the UE in the CELL_FACH state cannot be transited to the CELL_DCH state, the radio access network device further determines, according to the other of the two determination mechanisms, whether to transit the UE in the CELL_FACH state to the CELL_DCH state; and in this way, the radio access network device can transit the UE in the CELL_FACH state to the CELL_DCH state more timely, and sends the data packet to the UE through a DCH or an HS_SDCH, thereby improving timeliness that the UE acquires the data packet when the FACH is faulty, and facilitating the UE to carry out a variety of services based on the acquired data packet. For example, the UE can log in to a network or open a web page in time.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof however, these modifications or replacements do not make the essence of corresponding technical solutions depart from the scope of the technical solutions in the embodiments of the present invention.

What is claimed is:

1. A data packet sending method, comprising:
receiving, by a radio access network device, a data packet sent by a core network device, where the data packet has a destination of a user equipment currently in a forward access channel (CELL_FACH) state;
caching, by the radio access network device after the receiving, the received data packet sent by the core network device;
acquiring, by the radio access network device after the caching, a duration that the received data packet is cached on the radio access network device;
conditionally transitioning the user equipment from the CELL_FACH state to a dedicated channel (CELL_DCH) state, wherein, during the conditionally transitioning, if the duration that the data packet is cached is greater than or equal to a preset wait duration threshold, then transitioning the user equipment from the CELL_FACH state to the CELL_DCH state, wherein the transitioning comprises sending, by the radio access network device, a radio bearer reconfiguration message to the user equipment currently in the CELL_FACH state to transition to the CELL_DCH state; and sending, after the transitioning, the received data packet to the user equipment via a dedicated channel associated with the CELL_DCH state of the user equipment.

2. The data packet sending method according to claim 1, wherein when a preset period arrives, the radio access network device acquires the duration that the data packet is cached, wherein the data packet is corresponding to the user equipment in the CELL_FACH state.

3. The data packet sending method according to claim 1, wherein before the acquiring, by the radio access network device, the duration that the data packet is cached, the method comprises:
   determining, by the radio access network device, a size of all data packets that are cached on the radio access network device and are corresponding to the user equipment in the CELL_FACH state; and
   performing, by the radio access network device if the size is less than a preset traffic volume threshold, the acquiring the duration that the received data packet is cached.

4. The data packet sending method according to claim 1, further comprising:
   sending, by the radio access network device if the duration that the data packet is cached is smaller than the wait duration threshold, the data packet to the user equipment in the CELL_FACH state through a forward access channel FACH.

5. The data packet sending method according to claim 1, further comprising:
   determining, by the radio access network device if the duration that the data packet is cached is smaller than or equal to the wait duration threshold, whether a size of all data packets that are cached on the radio access network device and are corresponding to the user equipment in the CELL_FACH state is greater than or equal to a preset traffic volume threshold, and
      if the size is greater than or equal to a preset traffic volume threshold, then transitioning, by the radio access network device, the user equipment in the CELL_FACH state to the CELL_DCH state, and sending the data packet to the user equipment that is transitioned to the CELL_DCH state; and
      if the size is less than the preset traffic volume threshold, then sending, by the radio access network device, the data packet to the user equipment in the CELL_FACH state through a forward access channel.

6. A radio access network device, comprising:
   a program processing hardware; and
   a non-transitory computer-readable medium including computer-executable instructions that are executed by the program processing hardware to carry out a method for handling a data packet received by the radio access network device from a core network device, where the data packet has a destination of a user equipment currently in a forward access channel (CELL_FACH) state, the method comprising:
      caching, by the radio access network device after the receiving, the received data packet sent by the core network device;
      acquiring, after the caching, a duration that the received data packet is cached on the radio access network device;
      conditionally transitioning the user equipment from the CELL_FACH state to a dedicated channel (CELL_DCH) state, wherein, during the conditionally transitioning, if the duration that the data packet is cached is greater than or equal to a preset wait duration threshold, transitioning the user equipment from the CELL_FACH state to the CELL_DCH state, wherein the transitioning transiting comprises sending, by the radio access network device, a radio bearer reconfiguration message to the user equipment currently in the CELL_FACH state to transition to the CELL_DCH state; and
      sending, after the transitioning, the received data packet to the user equipment via a dedicated channel associated with the CELL_DCH state of the user equipment.

7. The radio access network device according to claim 6, wherein during the acquiring when a preset period arrives, the radio access network device acquires the duration that the data packet is cached, wherein the data packet is corresponding to the user equipment in the CELL_FACH state.

8. The radio access network device according to claim 6, wherein the method further comprises:
   determining, before acquiring the duration that the data packet is cached, a size of all data packets that are cached on the radio access network device and are corresponding to the user equipment in the CELL_FACH state,
   performing, if the size is less than a preset traffic volume threshold, the acquiring the duration that the received data packet is cached.

9. The radio access network device according to claim 6, wherein the method further comprises:
   sending, if the duration that the data packet is cached is smaller than the wait duration threshold, the data packet to the user equipment in the CELL_FACH state through a forward access channel FACH.

10. The radio access network device according to claim 6, wherein the method further comprises:
   determining, if the duration that the data packet is cached is smaller than or equal to the wait duration threshold, whether a size of all data packets that are cached on the radio access network device and are corresponding to the user equipment in the CELL_FACH state is greater than or equal to a preset traffic volume threshold;
   if the size is greater than or equal to a preset traffic volume threshold, then transitioning the user equipment that is in the CELL_FACH state to the CELL_DCH state, and sending the data packet to the user equipment that is transitioned to the CELL_DCH state; and
   if the size is less than the preset traffic volume threshold, then sending the data packet to the user equipment in the CELL_FACH state through a forward access channel.

* * * * *

UNITED STATES PATENT AND TRADEMARK OFFICE
CERTIFICATE OF CORRECTION

PATENT NO. : 9,699,706 B2
APPLICATION NO. : 14/264989
DATED : July 4, 2017
INVENTOR(S) : Xueliang Wang It is certified that error appears in the above-identified patent and that said Letters Patent is hereby corrected as shown below:

Column 13, Line 28, "access channel FACH." should read -- access channel. --.

Column 14, Line 13, "transitioning transiting comprises" should read -- transitioning comprises --.

Column 14, Line 40, "access channel FACH." should read -- access channel. --.

Signed and Sealed this
Twentieth Day of February, 2018

Andrei Iancu
*Director of the United States Patent and Trademark Office*